April 8, 1930.　　　　P. C. SACCAGGIO　　　　1,754,181
CONTROL MECHANISM FOR POWER TRANSMISSION GEARING
Filed Nov. 14, 1927　　　2 Sheets-Sheet 1

Inventor,
Pedro C. Saccaggio
By
Atty

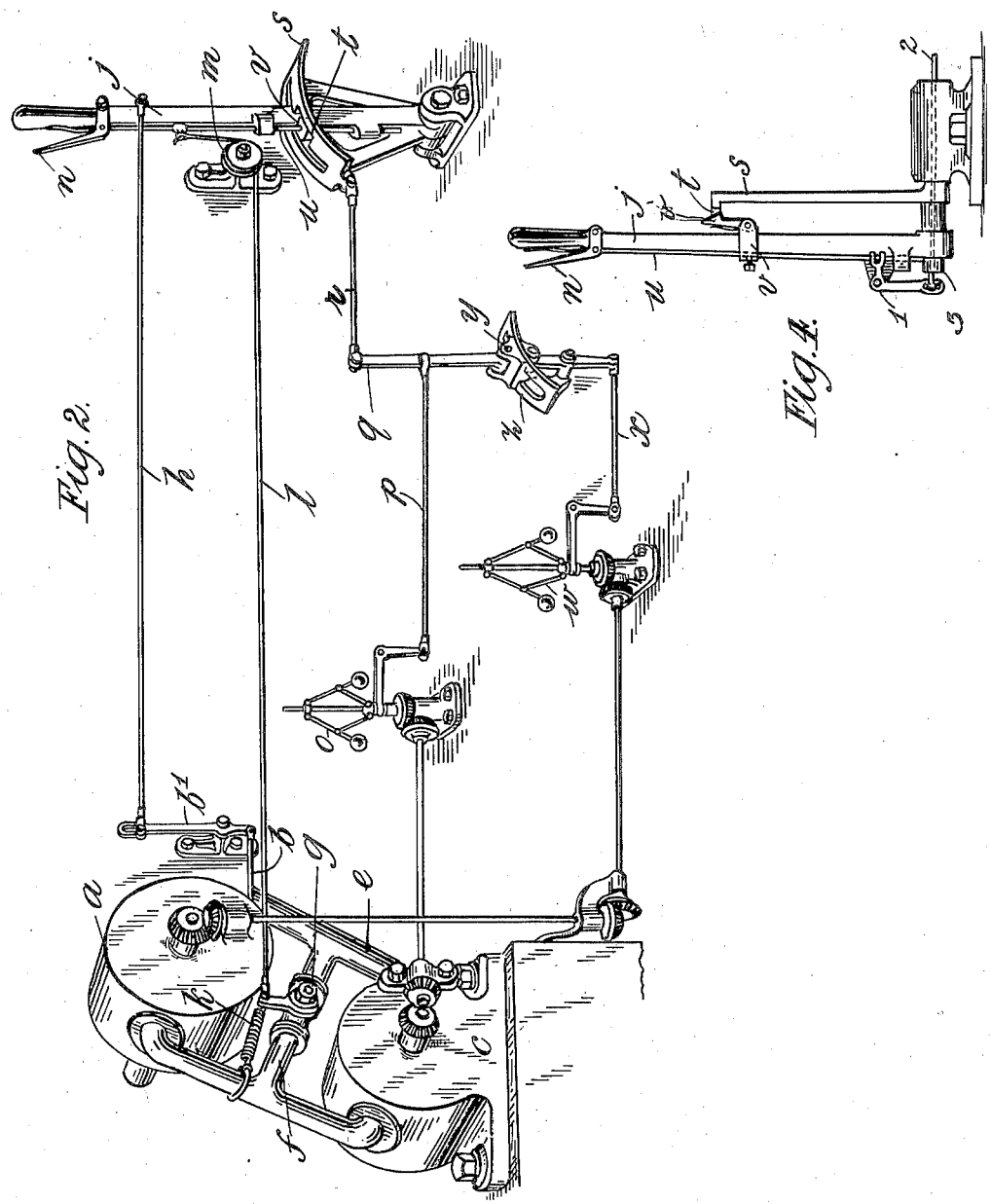

Patented Apr. 8, 1930

1,754,181

UNITED STATES PATENT OFFICE

PEDRO CELESTINO SACCAGGIO, OF BUENOS AIRES, ARGENTINA

CONTROL MECHANISM FOR POWER-TRANSMISSION GEARING

Application filed November 14, 1927, Serial No. 233,244, and in Great Britain August 23, 1927.

This invention relates to control mechanism for power transmission gearing and is particularly concerned with power transmission on vehicles, especially locomotive railway vehicles.

For many purposes it is advantageous to employ a power plant on a locomotive vehicle with a variable transmission between such plant and the track driving wheels. For example, a Diesel engine or steam engine power plant may be provided with a variable hydraulic or electric transmission. Hydraulic transmissions suitably comprise a variable stroke, or variable capacity, pump as the primary unit connected with a hydraulic motor as the secondary unit, the transmission ratio being varied by adjusting the stroke or capacity of the pump, a further variation being possible by adjusting a pump bye-pass valve which may be fully opened to permit the motor to run free. In some cases, the stroke or capacity of the motor may be variable. Similarly, electric transmissions may comprise as the primary unit a dynamo or electric generator with variable excitation and as the secondary unit a motor controllable as to its starting, working and running-free conditions.

A possible danger, in operating transmissions of this kind, is that of cutting in the power transmission too quickly or at an unsuitable ratio, whereby the prime mover may be stalled or violently stopped or the track wheels may be caused to slip and race on the track.

In the practical employment of transmissions of the nature aforesaid, an economy is effected by permitting the motor unit to run free when the conditions are suitable for permitting the vehicle or train to run under its own momentum or to coast on a down grade. There is the danger, however, that when the transmission is again to be used for power propulsion, the primary and secondary units of the transmission may be out of step or out of phase so that haphazard cutting in of the secondary unit might endanger the transmission.

An important object of this invention is to provide an automatic and fool-proof control which is adapted for ensuring at all times that the relative conditions of the primary and secondary units must be safe and suitable for the cutting in of the secondary unit in any of the conditions referred to.

A further object is to provide speed sensitive devices in association with the primary and secondary units of a transmission and to make these devices operative for adjusting the controls so that the latter can only be exercised for power application when a proper setting of such controls has been effected.

The invention will be further explained by a description of the practical examples illustrated in the accompanying drawing, in which:—

Figures 1 and 2 are diagrams of hydraulic transmissions with centrifugal governors operative upon the controls for the purpose set forth.

Figure 4 is an elevation of a modification of the control levers seen in Figure 2.

Figure 1:
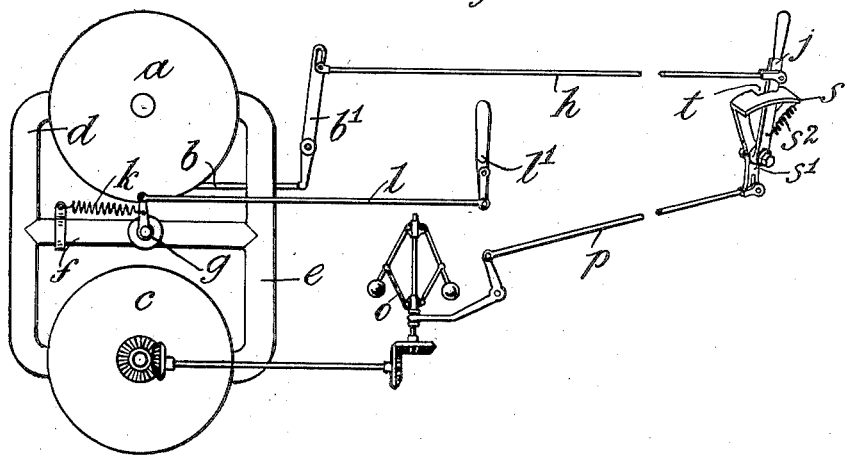

Referring to Figure 1, $a$ is a variable hydraulic pump of any suitable type and is connected with the prime mover on the vehicle, which prime mover may be a Diesel engine or a steam engine. $b$ is an adjustment rod for varying the stroke or capacity of the pump and as pumps of this character are well known, it is not thought to be necessary to give any detail description thereof. The hydraulic motor $c$ is connected with the pump by the pressure pipe $d$ and exhaust pipe $e$, and the speed ratio between pump and motor will depend, of course, upon the output of the pump $a$ which is variable by the control $b$. The pipes $d$ and $e$ are connected together by a bye-pass pipe $f$ in which is situated a valve $g$ and it is apparent that if the valve $g$ be fully opened the delivery of the pump $a$ will be bye-passed so that the motor $c$ will be free to run at any speed quite independently of the speed or output of the pump $a$.

The adjustment rod $b$ is operated by a lever $b'$ which is connected by a rod $h$ with a lever $j$ in the engineer's cab. The valve $g$ is normally held closed by a spring $k$ but may be opened by a pull on the rod $l$ connected with a hand lever $l'$. A governor $o$ is connected through a suitable linkage $p$ with an arm $s'$ of a double arm lever $s\ s'$, the arm $s'$ being in the form of a quadrant with a gap $t$ in which is situated the lever $j$. It will be seen that the lever $j$ can move to a limited extent in the gap $t$ and is normally held against the rear limit wall of the gap by a spring $s^2$.

Assume that the vehicle is at rest, the pump $a$ being adjusted to no stroke or zero capacity so that no fluid is forced into the motor. For starting the vehicle, the lever $j$ is moved leftwards in Figure 1 so as to move to the forward end of the gap $t$ where it is arrested. This movement of the lever $j$ adjust the pump $a$ so that the latter has an effective stroke or capacity and now circulates fluid through the motor $c$. The latter now starts and drives the vehicle and also drives the governor $o$ which through the linkage $p$ adjusts the quardant $s$ in the same direction as the lever $j$ has been adjusted, thereby causing the gap $t$ to advance on the lever $j$ and to permit a further forward adjustment of the latter. Such further forward adjustment will result in an increased speed of the motor $c$ and the vehicle driven thereby and a further forward adjustment of the quadrant $s$ by the governor $o$. Thus, the governor action insures gradual adjustment of the transmission control, so that an unsuitable transmission ratio cannot be cut in so quickly as to stall the prime mover, or so quickly as to cause the vehicle wheels to be driven at such an excessive starting speed as to produce objectionable slippage. If at any time the lever $l'$ should be operated to open the valve $g$ to permit the motor $c$ to run free, the said motor will continue to drive the governor $o$ and the latter, in the event of alteration in vehicle speed, will adjust the quadrant $s$ and with it the lever $j$ so that upon re-closure of the valve $g$ the control will be found in a suitable position to suit the instant speed of the motor $c$ and also in a poistion for adjusting the pump stroke or capacity to give the appropriate transmission ratio.

According to the modification in Figure 2, the valve $g$ is operated by a flexible connection $l$ passing beneath a guide roller $m$ and connected with a sliding rod $u$ operated by a trigger lever $n$ on the control lever $j$. The rod $u$ carries a block $v$ which is normally located in the gap $t$ of the quadrant $s$. The quadrant in this modification is adjusted by the governor $o$ through the medium of a linkage $p$, lever $q$ and link $r$. It will be understood that the drawings are purely diagrammatic and that in Figure 2 for example the lever $j$ is adjustable to and fro without pulling on the connector $l$, the latter being operatively pulled only when the trigger lever $n$ is operated. At starting, the lever $j$ is moved forward so as to carry the block $v$ forward to the extent permitted by the gap $t$. Thereupon, the motor $c$ is started at slow speed, as in Figure 1, and through the governor $o$ and linkage $p\ q\ r$ adjusts the quadrant $s$ to permit of further forward adjustment of the lever $j$. Let it be assumed that the pump $a$ has been adjusted for driving the vehicle at a speed of 30 miles per hour. If, now, the trigger $n$ is operated to bye-pass the pump, the motor $c$ runs freely. During such free-running the train may slow down, or may accelerate as would be the case in coasting on a down grade. Thus, for example, the train speed may reach fifty miles per hour at the moment that the engineer desires to resume power transmission. If at this moment the engineer should release the trigger lever $n$ whilst retaining the lever $j$ in the same position that it occupied when the valve $g$ was opened at a train speed of thirty miles per hour, it is clear that the transmission apparatus would suffer damage. The valve $g$ can only be closed with safety if the pump $a$ is first adjusted to suit the instant speed of the motor $c$, which in the example under consideration is assumed to correspond to a train speed of fifty miles per hour.

Assume that at a speed of thirty miles per hour the engineer desires to have a free-running motor, he presses the trigger lever $n$ against the handle of the lever $j$, thereby pulling on the connector $l$ and opening the pump bye-pass valve $g$ and at the same time lifting the rod $u$ and elevating the block $v$ out of the recess $t$. If the train speed now accelerates, the governor $o$ will adjust the quadrant $s$ so that the recess $t$ is no longer beneath the block $v$. Therefore, should the engineer release the trigger $n$ when power transmission is to be restored, it will be impossible for the valve $g$ to close whilst an improper speed ratio exists between pump and motor, for the block $v$ will be arrested by the quadrant so as to prevent the descent of the rod $u$ to which the flexible connector $l$ is attached. The engineer must first adjust the lever $j$ so that it is opposite the recess $t$, the output of the pump being thereby suited to the instant speed of the motor $c$. In that condition of the parts, the recess $t$ is found immediately beneath the block $v$ so that the latter can descend, the consequent descent of the rod $u$ and slackening of the conductor $l$ permitting the valve $g$ to close and restore power transmission at proper speed ratio between pump and motor.

If the prime mover is of such a character that the uniformity of its speed cannot be relied upon, it is advisable to gear a governor $w$ with the spindle of the pump $a$ or other driven part and, by an appropriate linkage $x$, make such governor $w$ operative for shifting the pivot $y$ of the rocking lever $q$. For this purpose, the pivot $y$ may be slidable in an arcual guide $z$, as shown. Thus, an automatic control sensitive to pump speed may be superimposed upon the automatic control sensitive to motor speed, whereby the quadrant $s$ will always have an appropriate position for safeguarding the apparatus in spite of either pump or motor speed variations.

In Figure 4 the lever $j$ is pivoted adjacent to a pivoted notched quadrant $s$ and on the lever there is a slider $v$ connected with the rod $u$ of the trigger lever $n$. On the slider $v$ there is an upwardly directed spring-operated pawl or tooth device $v'$ which normally rests in the notch $t$ in the quadrant $s$ as shown. The lower end of the rod $u$ is connected with one arm of a bell-crank lever 1, the other arm of the latter being operatively connected with a rod, cable or the like 2 passing concentrically through the pivot 3 of the lever $j$ and quadrant $t$. The connector 2 in Figure 4 is intended for control of the valve $g$ in Figure 2. At any moment during a run the engineer can operate the trigger lever $n$ to raise the slider $v$ and pull on the connector 2. In the event of the motor speed altering, the governor shifts the quadrant $s$ as above described so that the notch $t$ in the quadrant is carried from beneath the pawl or tooth $v'$. If the trigger $n$ be then released, the tooth $v'$ catches on the quadrant so that the valve $g$ is not released and permitted to close. In order that this closure may take place, the engineer must first shift the lever $j$ so that it comes opposite the notch in the quadrant to permit the tooth $v'$ to pass through. However, it would be within the discretion of a skilled mechanician to employ any suitable mechanical expedients for the practical carrying out of the invention in the manner described.

The invention is applicable to electric transmission gearing comprising dynamo and motor combinations. Thus, for example, the lever $j$ instead of controlling the capacity or stroke of a hydraulic pump may control the excitation of a dynamo driven by an engine on the locomotive or vehicle, the trigger lever $n$ may operate the control switch of a motor in circuit with the dynamo, whilst the governor $o$ would be driven by or in accordance with the speed of the motor, as before. If the dynamo excitation be adjusted for driving the motor at a given speed and the circuit is opened at that speed for coasting, it may be important to permit re-closing of the motor switch only when the dynamo excitation is adjusted to correspond with the instant speed of the motor. For this purpose, either of the safety mechanisms described with reference to Figures 1 and 2, may be employed.

Figure 3:
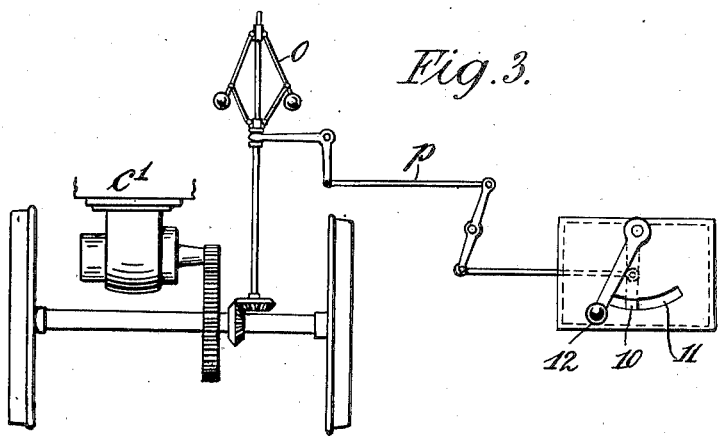
Figure 3 is a diagram of an electric transmission with a centrifugal governor operative upon the motor controller in accordance with these improvements.

A simple arrangement is illustrated in Figure 3 wherein $c'$ is an electric motor supplied with current from a dynamo driven by a suitable prime mover on the vehicle. The motor $c'$ drives the vehicle axle through suitable gearing and a governor $o$ geared with the axle has its sleeve operatively connected with a linkage $p$ which is adapted for shifting a stop 10 to and fro in a slot 11 in accordance with speed variations. The controller of the motor $c'$ is operated by a handle 12, the stop 10 being in the path of such handle. When the vehicle is standing, the handle 12 occupies the zero position shown a little to the rear of the stop 10. At starting, the handle 12 is moved forwards until arrested by the stop 10. The motor $c'$ now starts and drives the vehicle, and the governor $o$ becomes effective for advancing the stop 10, thereby permitting the handle 12 to be advanced to a similar extent so that the speed of the vehicle may be gradually accelerated.

In the examples herein described, the control levers $j$ have been directly operative upon the pump control, but it will be apparent that servo-control gear may be employed in which the operation of a hand lever controls a power device which, in turn, effects a corresponding adjustment of the pump stroke or capacity regulator.

I claim:—

1. Power transmission apparatus for propulsion of vehicles, comprising primary and secondary transmission units with associated means adjustable to provide infiniate variation of the transmission ratio between said units, a manual or servo control device for operating said adjustable means, a safety stop adjustable in relation to said control device, a speed sensitive device energized in accordance with the instant speed conditions of the secondary unit, and operative connection between said speed sensitive device and said safety stop to adjust the latter with respect to said control device.

2. Power transmission apparatus for propulsion of vehicles, comprising primary and secondary transmission units with associated means adjustable to alter the transmission ratio between said units, a control lever in operative connection with said adjustable means, a stop on said lever, arresting means movable relatively to said lever and adapted to arrest said stop by direct action thereon, speed sensitive means energized in accordance with the instant speed conditions of the secondary unit and operative connection between said speed sensitive device and said arresting means to adjust the latter in relation to said stop.

3. Power transmission apparatus for propulsion of vehicles, comprising primary and secondary transmission units with associated means adjustable to alter the transmission ratio between said units, a control lever effective on said adjustable means, a rockable safety device movable about the pivot of said lever, speed sensitive means responsive to speed changes of the secondary unit and operative connection between said speed sensitive means and said safety device for adjusting the latter in relation to said lever.

4. Power transmission apparatus for propulsion of vehicles, comprising primary and secondary transmission units with associated means adjustable to vary the transmission ratio between said units, a control lever effective on said adjustable means, a device for establishing or breaking transmission conditions between said units, a second control lever mounted on the first lever and operatively connected with said device, a rockable member on the pivot of the first control lever, arresting means on said rockable member, a stop device slidable on said first control lever and normally co-operating with said arresting means to limit relative circular movement between said lever and said rockable member, an operative connection between said second control lever and said stop device for the radial withdrawal of said stop from said arresting means, speed sensitive means responsive to speed changes of the secondary unit and operative connection between said speed sensitive device and said rockable member for automatically adjusting the latter in relation to said lever, said arresting means being adapted for preventing radial return movement of said stop excepting in the condition of appropriate relationship between the first control lever and said rockable member.

5. Power transmission apparatus for propulsion of vehicles comprising primary and secondary transmission units with associated means adjustable to alter the transmission ratio between said units, control means in operative connection with said adjustable means, a rockable safety device for said control means and in which the latter has limited permissible adjustment, speed sensitive means responsive to speed changes of the secondary unit, and operative connection between said speed sensitive means and said rockable device to move the latter in the direction of adjustment of said control means.

6. Power transmission apparatus for propulsion of vehicles, comprising primary and secondary transmission units with associated means adjustable to alter the transmission ratio between said units, a control means in operative connection with said adjustment means, a rockable safety device for said control means and in which the latter has limited permissible adjustment, speed sensitive means responsive to speed changes of said secondary unit, operative connection between said speed sensitive means and said rockable device to adjust the latter in the direction of adjustment of said control means, speed sensitive means responsive to speed changes of said primary unit, and operative connection between the last-mentioned speed sensitive means and the rockable safety device for modifying the movements imparted to the latter by the first speed sensitive means.

7. Power transmission apparatus for propulsion of vehicles, comprising primary and secondary transmission units with associated means adjustable to vary the transmission ratio between said units, a control lever in operative connection with said adjustable means, a rockable abutment device adapted for permitting limited movement of said lever relatively to said abutment device, a device for establishing or breaking transmission conditions between said units, a second lever mounted on said control lever and connected with the last-mentioned means, a stop operatively connected with said second lever and movable out of a normal setting in said abutment device when the second control lever is operated for breaking transmission conditions, speed sensitive means responsive to speed changes of said secondary unit, and operative connection between said speed sensitive means and said abutment device for moving the latter in relation to the first lever, said abutment device being adapted for arresting the return of said stop in the event of improper relative positions existing between the control lever and said abutment device.

8. Power transmission apparatus for propulsion of vehicles, comprising primary and secondary transmission units with associated means adjustable to vary the transmission ratio between said units, a control lever in operative connection with said adjustable means, a device for establishing or breaking transmission conditions between said units, a second control lever in operative connection with such device, a stop slidable on the first lever and operatively connected with the second lever, a rockable quadrant formed with a gap to receive said stop in one position of relative adjustment between said quadrant and the first lever, and speed sensitive means driven in connection with said secondary unit and operative for adjusting said quadrant in relation to the first lever.

9. Power transmission apparatus for propulsion of vehicles, comprising primary and secondary transmission units with associated means adjustable to vary the transmission ratio between said units, a control lever in operative connection with said adjustable means, a device for establishing or breaking transmission conditions between said units, a second control lever mounted on the first lever and in operative connection with such device, a stop slidable on the first lever and operatively connected with the second lever, a rockable quadrant formed with a gap to receive said stop in one position of relative adjustment between said quadrant and the first lever but to arrest said stop in all other of such positions, speed-sensitive means driven in connection with said secondary unit, a linkage between said speed-sensitive means and said quadrant, a second speed-sensitive means driven in connection with said primary unit, and an operative connection between the last-named means and said linkage whereby the two speed-sensitive means co-operate to adjust the quadrant in relation to the first lever.

10. Power transmission apparatus for the propulsion of vehicles, comprising primary and secondary transmission units with associated means adjustable to vary the transmission ratio between said units, a control for said adjustable means, a stop device movable with said control, a rockable abutment adapted to be engaged by said stop device after limited movement in the circular direction, a device for making or breaking transmission conditions between said units, a second control for such device, an operative connection between said second control and said stop device for withdrawing the latter radially from the circular path of said rockable abutment the latter being adapted for permitting radial re-entry of said stop into said path only when a definite relation exists between the first control and said rockable abutment, and speed sensitive means under the operative influence of said primary and secondary units and operative for adjusting said rockable abutment in accordance with speed relations between said units.

11. Power transmission apparatus for the propulsion of vehicles comprising a power unit and a motor unit, a controller for said motor unit, an adjustable stop movable in the path of said controller for limiting the movement thereof, and speed sensitive means in driving connection with said motor unit and operatively connected with said stop for automatically adjusting the latter in the same direction as said controller is adjusted in controlling said motor unit.

PEDRO C. SACCAGGIO.